US012067757B2

(12) United States Patent
Ohira

(10) Patent No.: US 12,067,757 B2
(45) Date of Patent: Aug. 20, 2024

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Yoshie Ohira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 492 days.

(21) Appl. No.: 17/329,313

(22) Filed: May 25, 2021

(65) Prior Publication Data
US 2022/0198210 A1    Jun. 23, 2022

(30) Foreign Application Priority Data

Dec. 18, 2020 (JP) ................... 2020-210732

(51) Int. Cl.
  *G06V 10/40*   (2022.01)
  *G06F 18/22*   (2023.01)
  *G06V 30/10*   (2022.01)
  *G06V 30/148*  (2022.01)

(52) U.S. Cl.
  CPC .............. *G06V 10/40* (2022.01); *G06F 18/22* (2023.01); *G06V 30/10* (2022.01); *G06V 30/153* (2022.01)

(58) Field of Classification Search
  CPC ...... G06V 30/10; G06V 30/153; G06V 10/40; G06F 18/22
  See application file for complete search history.

(56) References Cited

U.S. PATENT DOCUMENTS

2012/0081734 A1* 4/2012 Ikeda ................. H04N 1/00244
                                                  358/1.14
2021/0110152 A1* 4/2021 Noda .................... G06V 30/416

FOREIGN PATENT DOCUMENTS

JP        2000-155802 A    6/2000

* cited by examiner

*Primary Examiner* — Daniel G Mariam
(74) *Attorney, Agent, or Firm* — Oliff PLC

(57) ABSTRACT

An information processing apparatus includes a processor configured to: read character string information written on a paper document; obtain, from an external system that performs processing using the read character string information, external system information indicating a use condition relating to use of character string information in the external system; and determine whether the read character string information matches the external system information obtained from the external system.

8 Claims, 11 Drawing Sheets

FIG. 10

| ITEM | TYPE | DESCRIPTION |
|---|---|---|
| READ IMAGE | Picture | BUTTON FOR CONDUCTING OPERATION CHECK ON DISPLAYED RECORD |
| RECOGNITION RESULT | TextBox | |
| ERROR ICON | Icon | ICON INDICATING ITEM WITH WHICH OPERATION CHECK ERROR HAS OCCURRED. IF PLURAL OPERATION CHECK ERRORS HAVE OCCURRED WITH ONE ITEM, AS MANY ICONS ARE DISPLAYED TO LEFT.<br>(Glyph:xux-icon-alert) |
| ERROR MESSAGE | Label | ■ WHEN ONE OPERATION CHECK ERROR HAS OCCURRED WITH ITEM<br>△ [REGISTRATION CONDITION] IS [NEW], BUT THERE IS NO DATA IN [ADDRESS].<br>■ WHEN PLURAL OPERATION CHECK ERRORS HAVE OCCURRED WITH ITEM<br>△ [WORD CHECK A] WORD [AI] IS INCLUDED.<br>△ [WORD CHECK B] WORDS ON LIST B ARE NOT INCLUDED.<br>DISPLAY MESSAGE AS FOLLOWS<br>[{OPERATION CHECK NAME}] {ERROR MESSAGE} |

FIG. 11

EDIT APPLICATION FORM B250  [KEEP] [X]

CONFIGURATION → DRAFT → READING METHOD → CHECK → CHECK OUTPUT → COMPLETE

CSV OUTPUT SETTINGS | IMAGE OUTPUT SETTINGS

FILE NAME {JOB RULE NAME}_{OUTPUT TIME}⊕.csv
CHARACTER CODE ●UTF-8 (WITH BOM)  ○UTF-8  ○Shift-JIS
HEADER ●YES ○NO

| COLUMN A | COLUMN B | COLUMN C | COLUMN D | COLUMN E |
|---|---|---|---|---|
| FINANCIAL INSTITUTION NAME | BRANCH NAME | NOTIFICATION TYPE | NAME | NOTIFICATION DATE |
| YOKOHAMA | YOKOHAMA | START | TARO YAMADA | AUG. 10, 2020 |
| KAWASHIN | KAWASAKI | STOP | TARO FUJI | AUG. 11, 2020 |
| ASHIKAGA | ASHIKAGA | START | TARO XERO | AUG. 12, 2020 |

⊕

[DOWNLOAD] [NEXT]
[BACK]

FIG. 12

EDIT APPLICATION FORM B250

CONFIGURATION → DRAFT → READING METHOD → CHECK → CHECK OUTPUT → COMPLETE

KEEP

CSV OUTPUT SETTINGS - COLUMN A

TYPE: OCR CHECK AND CORRECTION RESULT

READING ITEM: FINANCIAL INSTITUTION NAME - [TEXT RECOGNITION FRAME]

CONVERSION PROCESS 1: NONE

DELETE  OK  CANCEL

BACK  NEXT

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-210732 filed Dec. 18, 2020.

BACKGROUND

(i) Technical Field

The present disclosure relates to an information processing apparatus and a non-transitory computer readable medium.

(ii) Related Art

Information processing apparatuses that perform information processing for recognizing characters on images obtained by optically reading forms are known. In Japanese Unexamined Patent Application Publication No. 2000-155802, for example, optical character recognition (OCR) input data screen correction means is disclosed that recognizes, through OCR, items written in a form and corrects a result of the recognition and that includes recognition result management means capable of holding a result of recognition of one form, extracting a result of recognition in each of fields of the form, and holding page images of the form, character field correction means capable of displaying and correcting the result of recognition in each of the fields extracted by the recognition result management means and, if the result of recognition is corrected, notifying the recognition result management means of the corrected result of recognition, and image display means capable of displaying an image in each of the fields or the page image obtained by the recognition result management means.

SUMMARY

When an information processing apparatus that reads character string information written on a paper document outputs the character string information to an external system and the information processing apparatus and the external system cooperate with each other, the character string information output from the information processing apparatus might not satisfy a condition defined in the external system. A case is assumed, for example, where an information processing apparatus that outputs character string information that is a result of OCR performed on character string information handwritten by a user in a form and an external system that uses the character string information for a predetermined process cooperate with each other. When use conditions are defined in advance for character string information used in the external system in this case, the predetermined process might not be performed in the external system if the information processing apparatus outputs the character string information, which is the result of recognition, to the external system without processing the character string information. Whether the character string information is applicable in the external system, therefore, needs to be determined in advance.

Aspects of non-limiting embodiments of the present disclosure relate to an information processing apparatus and a non-transitory computer readable medium capable of checking whether character string information written on a paper document is applicable in an external system.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: read character string information written on a paper document; obtain, from an external system that performs processing using the read character string information, external system information indicating a use condition relating to use of character string information in the external system; and determine whether the read character string information matches the external system information obtained from the external system.

BRIEF DESCRIPTION OF THE DRAWINGS

An exemplary embodiment of the present disclosure will be described in detail based on the following figures, wherein:

FIG. 10 is a diagram illustrating another example of the check screen relating to the operation check according to the exemplary embodiment;

FIG. 11 is a diagram illustrating an example of a setting screen relating to data conversion; and FIG. 12 is a diagram illustrating another example of the setting screen relating to the data conversion.

DETAILED DESCRIPTION

Figure 1:
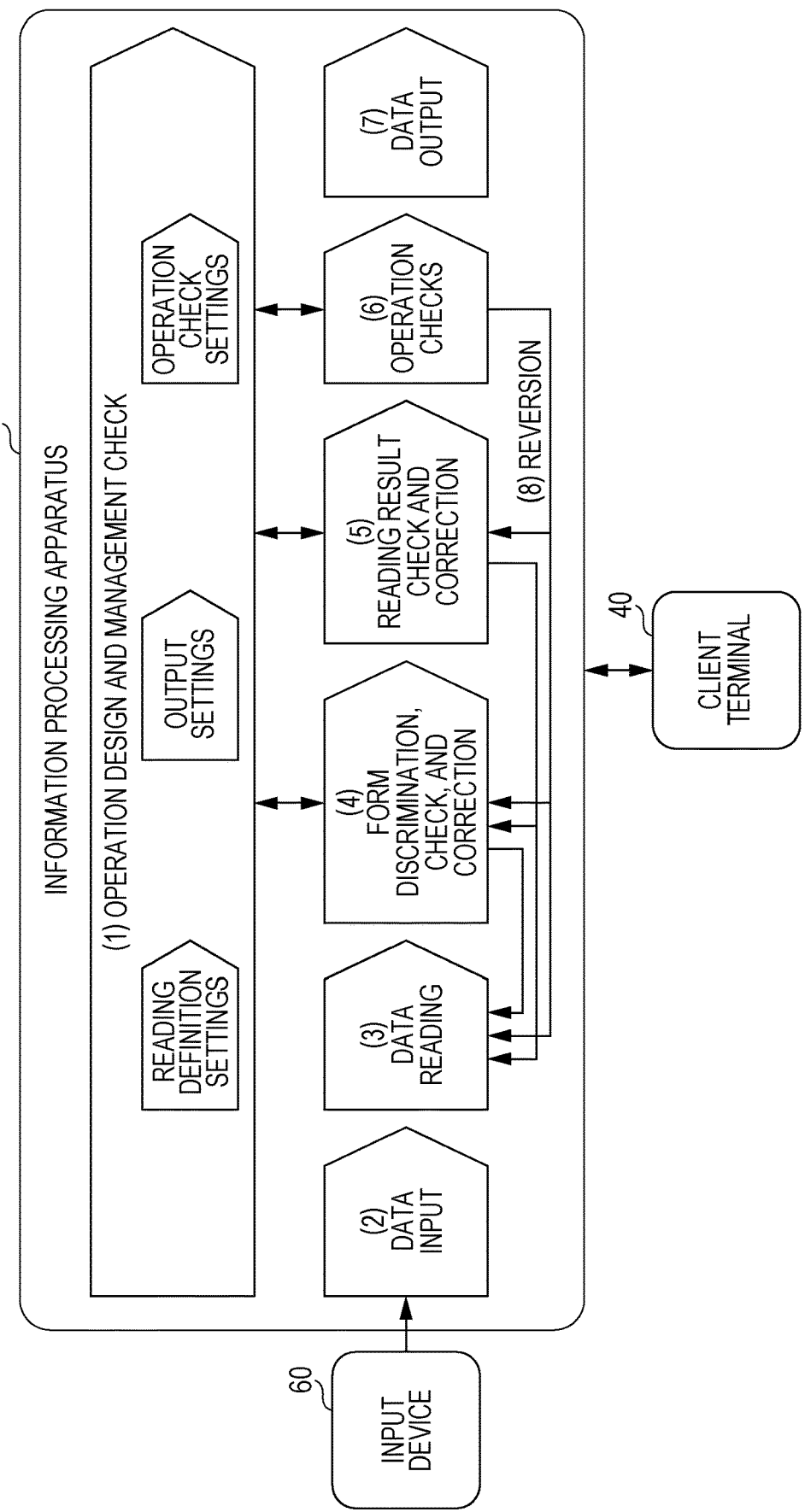
FIG. 1 is a diagram illustrating the schematic configuration of a form system according to an exemplary embodiment.

An exemplary embodiment for implementing techniques in the present disclosure will be described in detail hereinafter with reference to the drawings. Components and steps that achieve the same operations, effects, or functions are given the same reference numerals throughout the drawings, and redundant description thereof might be omitted as necessary. The drawings are only specific enough to facilitate understanding of the techniques in the present disclosure. The techniques in the present disclosure, therefore, are not limited to examples illustrated in the drawings. In the exemplary embodiment, description of known components and components that are not directly related to the present disclosure might be omitted.

FIG. 1 is a diagram illustrating the schematic configuration of a form system 10 according to a first exemplary embodiment.

As illustrated in FIG. 1, the form system 10 includes an information processing apparatus 20, a client terminal 40, and an input device 60. These apparatuses are connected to a network, which is not illustrated, and communicate with one another over the network. The network is, for example, the Internet, a local area network (LAN), or a wide-area network (WAN).

The information processing apparatus 20 manages a process where OCR is performed on image data regarding documents including a form input through an input device 60 and a result of the OCR is output to a predetermined destination. A specific configuration of, and an effect produced by, the information processing apparatus 20 will be described later.

The client terminal 40 transmits various instructions relating to OCR to the information processing apparatus 20. The various instructions include, for example, an instruction to start to read image data and an instruction to display a result of the reading of the image data. The client terminal 40 also displays, in accordance with various instructions that have been received, various pieces of information such as a result of OCR performed by the information processing apparatus 20 and notifications about the OCR. The client terminal 40 is, for example, a server computer or a general-purpose computer such as a personal computer (PC). Although FIG. 1 illustrates only one client terminal 40, plural client terminals 40 may be prepared, instead, and used for different processes.

The input device 60 inputs image data to be subjected to OCR to the information processing apparatus 20. The input device 60 is, for example, a server computer, a general-purpose computer such as a PC, or an image forming apparatus having a scanning function, a printing function, and a facsimile function. In addition to the input device 60, the client terminal 40 may also be able to input image data to the information processing apparatus 20.

Next, an outline of the form system 10 will be described.

In the form system 10, the information processing apparatus 20 performs OCR on image data input through the input device 60 and outputs a result of the OCR to a predetermined destination.

In the OCR, the information processing apparatus 20 manages various processes including (1) operation design and management check, (2) data input, (3) data reading, (4) form discrimination, check, and correction, (5) reading result check and correction, (6) operation checks, (7) data output, and (8) reversion. In the present exemplary embodiment, the OCR includes not only a process for reading characters, symbols, and the like from image data but also post-processing such as correction of the characters.

In an example of the management of the various processes, the information processing apparatus 20 automatically performs (1) operation design and management check, (2) data input, (3) data reading, (6) operation checks, and (7) data output. As for (4) form discrimination, check, and correction and (5) reading result check and correction, a user makes inputs using the client terminal 40. The information processing apparatus 20 may automatically perform (8) reversion, or the user may make an input for (8) reversion using the client terminal 40.

In (1) operation design and management check, job rules including reading definition settings, output settings, and operation check settings are created. In the reading definition settings, for example, reading areas, in which image data is to be read in (3) data reading, are set. More specifically, for example, a definition is set such that item values, which are values to be read, will be read from rightward areas of items to be extracted as keys. In the output settings, for example, a file format of data output in (7) data output and a destination are set. In the operation check settings, for example, a format including required input items and the number of characters that can be input in a form to be detected in (6) operation checks is set.

In (2) data input, image data is input from the input device 60. The input image data is registered as a job, which is a unit for which (3) data reading is to be performed.

In (3) data reading, the image data in the job is read using some of the job rules created in (1) operation design and management check and selected by the user for the job. In this process, for example, discrimination of a form included in the image data in the job (hereinafter referred to as "form discrimination") and reading of characters and symbols in the reading areas are performed.

In (4) form discrimination, check, and correction, the image data in the job is divided into records indicating the form included in the job on the basis of a result of the form discrimination performed in (3) data reading. The records are then displayed in this process, and the user checks and corrects the result of the form discrimination.

In (5) reading result check and correction, a result of the reading of characters and symbols in the reading areas performed in (3) data reading is displayed, and the user checks and corrects the result of reading.

In (6) operation checks, an error in each of the preceding processes is detected on the basis of the operation check settings included in some of the job rules selected by the user for the job, the job rules having been created in (1) operation design and management check. A result of the detection may be presented to the user.

In (7) data output, output data is created and output to a predetermined destination using the output settings included in some of the job rules selected by the user for the job, the job rules having been created in (1) operation design and management check.

In (8) reversion, a process performed in the OCR is reverted to another process one or more steps before. For example, the user requests reversion using the client terminal 40 during (4) form discrimination, check, and correction, (5) reading result check and correction, or the like. Alternatively, for example, a manager requests reversion using his/her client terminal 40 in accordance with a result of a check conducted by the manager between (6) operation checks and (7) data output.

In the OCR, (1) operation design and management check is performed before (3) data reading and the later processes are performed, that is, before the form system 10 is operated. Alternatively, (1) operation design and management check may be performed while (3) data reading and the later processes are being performed, that is, while the form system 10 is being operated. For example, the job rules created in (1) operation design and management check before the form system 10 is operated may be corrected in accordance with a result of (5) reading result check and correction, which is performed while the form system 10 is being operated.

Information Processing Apparatus

Figure 2:
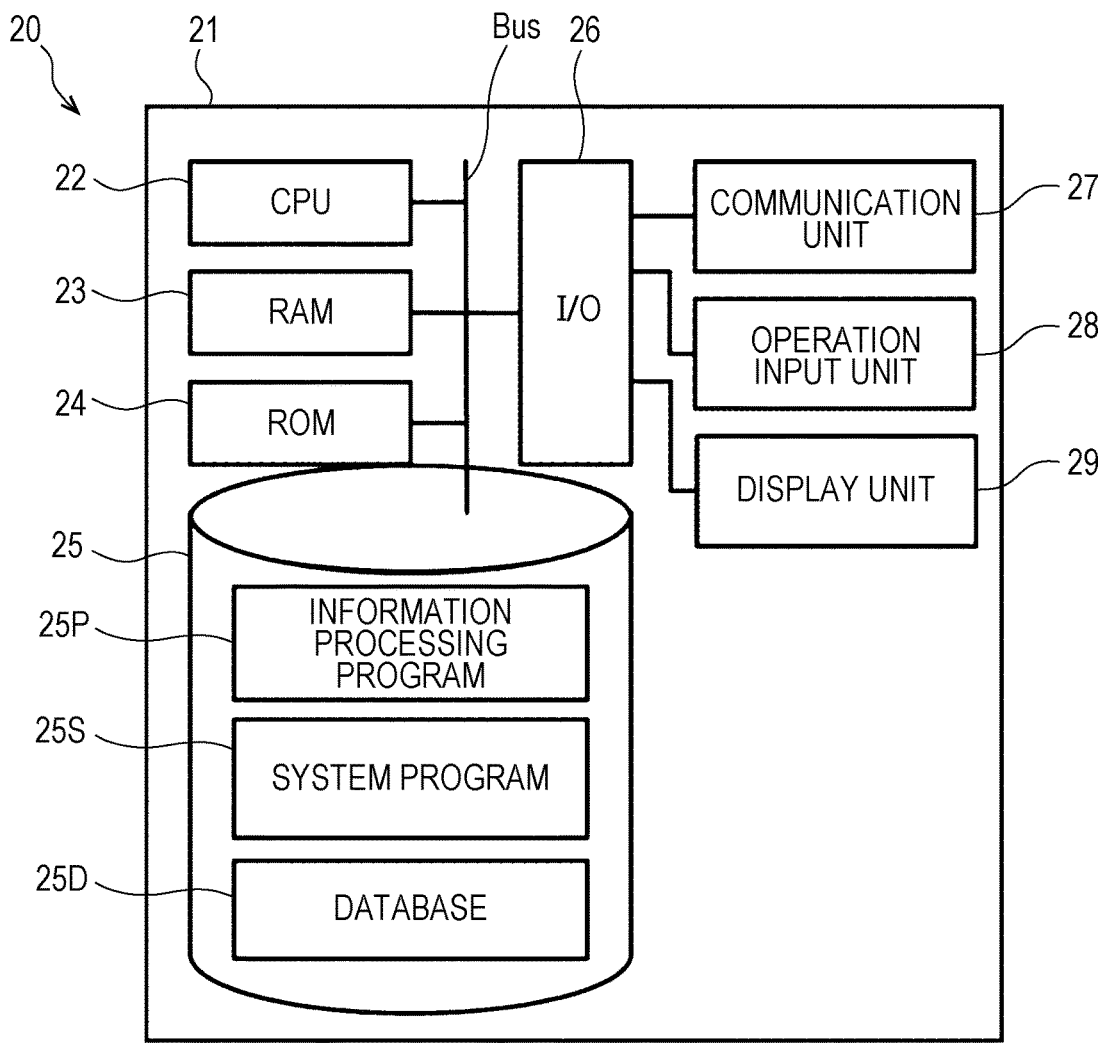
FIG. 2 is a diagram illustrating an example of the schematic electrical configuration of an information processing apparatus according to the exemplary embodiment.

Next, an example of the configuration of the information processing apparatus 20 will be described with reference to FIG. 2. FIG. 2 is a diagram illustrating an example of the schematic electrical configuration of the information processing apparatus 20 according to the present exemplary embodiment. The information processing apparatus 20 is, for example, a server computer or a general-purpose computer such as a PC.

More specifically, as illustrated in FIG. 2, the information processing apparatus 20 includes a computer 21. The computer 21 includes a central processing unit (CPU) 22, a random-access memory (RAM) 23, a read-only memory (ROM) 24, a storage unit 25, and an input/output port (I/O) 26. The CPU 22, the RAM 23, the ROM 24, the storage unit 25, and the I/O 26 are connected to one another by a bus Bus.

Functional units such as a communication unit 27 for achieving communication with external apparatuses, an operation input unit 28 that enables the user to input operations, and a display unit 29 that displays images are connected to the I/O 26. These functional units can communicate with the CPU 22 through the I/O 26.

The computer 21 may be achieved as a sub-control unit that controls a part of the information processing apparatus 20 or may be achieved as a control unit that controls the entirety of the information processing apparatus 20. An integrated circuit (IC) such as a large-scale integration (LSI) circuit or an IC chipset, for example, is used for a part or the entirety of each of blocks of the computer 21. Independent circuits may be used for different blocks, or a circuit on which some or all of the blocks are integrated may be used. The blocks may be integrated with one another, or some blocks may be separately provided. In each of the blocks, a part of the block may be separately provided. The computer 21 need not be integrated using an LSI circuit, and a dedicated circuit or a general-purpose processor may be used, instead.

The storage unit 25 stores an information processing program 25P for causing the information processing apparatus 20 to function as an information processing apparatus in the present disclosure. The CPU 22 reads the information processing program 25P from the storage unit 25 and loads the information processing program 25P into the RAM 23 to perform a process. By executing the information processing program 25P, the information processing apparatus 20 operates as the information processing apparatus in the present disclosure. The information processing program 25P may be provided in a storage medium such as a compact disc read-only memory (CD-ROM). A specific process performed by the information processing apparatus 20 will be described later.

An auxiliary storage device such as a hard disk drive (HDD), a solid-state drive (SSD), or a flash memory, for example, is used as the storage unit 25.

The information processing program 25P may be stored in the ROM 24, instead. Alternatively, for example, the information processing program 25P may be installed on the information processing apparatus 20 in advance. Alternatively, the information processing program 25P may be achieved by installing, on the information processing apparatus 20, program information stored in a nonvolatile storage medium and distributed over the network, which is not illustrated. Examples of the nonvolatile storage medium include a CD-ROM, a magneto-optical (MO) disk, an HDD, a digital versatile disc read-only memory (DVD-ROM), a flash memory, and a memory card.

The storage unit 25 also stores a system program 25S for the information processing apparatus 20 to achieve functions in OCR. The CPU 22 reads the system program 25S from the storage unit 25 and loads the system program 25S into the RAM 23 to perform OCR. By executing the system program 25S, the information processing apparatus 20 becomes able to achieve system functions in OCR.

Although the information processing program 25P and the system program 25S are separate programs in the present exemplary embodiment, the information processing program 25P may be executed as one of processes included in the system program 25S, instead.

The storage unit 25 also stores a database 25D including external system information indicating use conditions for the external system. The storage unit 25 storing the database 25D functions as an accumulation unit that accumulates the information indicating the use conditions as external system information. The external system information need not necessarily be stored in the storage unit 25 in advance. For example, the external system information may be stored in an external apparatus that is not illustrated and obtained from the external apparatus over a communication network, instead. When the external system information is obtained from the external apparatus over the communication network, the obtained external system information may be stored in the storage unit 25 for future use.

The external system is a concept including an operation system that is a combination of hardware resources and software resources used by one or more processing apparatuses (e.g., computers) that cooperate with one another to achieve predetermined operation processing. The external system information includes information regarding the external system, and the use conditions indicated by the external system information are conditions about use of character string information in the external system and are a concept including a condition that defines how to handle character string information, such as characters and symbols. Characters and symbols will be referred to as "character strings" hereinafter. The use conditions include input conditions of character strings to target items in the external system required when the character strings are input to the external systems. The input conditions include, for example, an applicability condition indicating whether character strings can be input to target items in the external system and a combination condition indicating combinations of target items. The use conditions include restriction conditions for restricting use of character string information in the external system. The restriction conditions include, for example, a permission condition that defines character strings applicable in the external system and an inhibition condition that defines character strings inapplicable in the external system.

The communication unit 27 is connected to a communication network and achieves communication between the information processing apparatus 20 and external apparatuses or systems. The communication network is a concept including a network for achieving data communication between devices through a wired and/or wireless communication link. For example, the communication network may be a narrow area communication network (e.g., a LAN) that achieves data communication at a corporate base or a wide area communication network (e.g., a wide area network (WAN)), such as the Internet, that achieves data communication through a public communication link.

Devices for inputting operations, such as a keyboard and a mouse, are provided as the operation input unit 28.

A liquid crystal display (LCD) or an organic electroluminescent (EL) display, for example, is used as the display unit 29. A touch panel having a function of the operation input unit 28 may be used as the display unit 29, instead. The operation input unit 28 and the display unit 29 receive various instructions from the user of the information processing apparatus 20. The display unit 29 displays results of processes performed in accordance with instructions received from the user and various pieces of information such as notifications about the processes.

Figure 3:
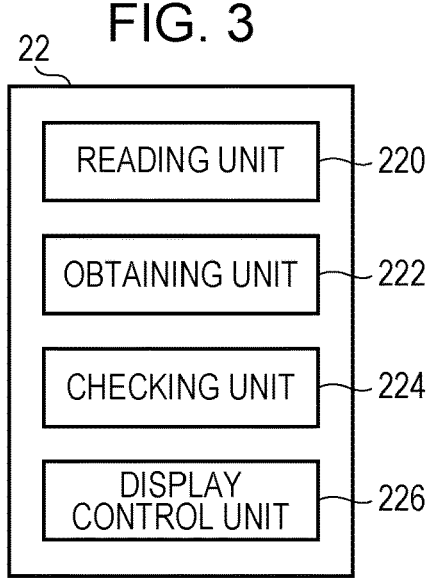
FIG. 3 is a diagram illustrating an example of the functional configuration of the information processing apparatus according to the exemplary embodiment.

FIG. 3 is a block diagram illustrating an example of the functional configuration of the information processing apparatus 20 according to the present exemplary embodiment.

As illustrated in FIG. 3, the CPU 22 of the information processing apparatus 20 according to the present exemplary embodiment functions as the information processing apparatus in the present disclosure by executing the information processing program 25P. The information processing apparatus in the present disclosure includes functional units that function as a reading unit 220, an obtaining unit 222, a checking unit 224, and a display control unit 226, respectively.

The reading unit 220 is a functional unit that reads character string information written in a form that is a paper document. In the present exemplary embodiment, the reading unit 220 reads character string information by obtaining a result of reading (character string information) corrected or identified using a result of character recognition of an image of a form in which a character string is written. More specifically, the reading unit 220 obtains character string information during OCR performed by the information processing apparatus 20 at an end of the reading result check and correction ((5) in FIG. 1).

The obtaining unit 222 is a functional unit that obtains external system information indicating use conditions relating to use of character string information in an external system. The obtaining unit 222 has a function of obtaining external system information from the storage unit 25 and a function of extracting use conditions corresponding to character string information read by the reading unit 220 from external system information stored in the database 25D.

The checking unit 224 is a functional unit that checks applicability of character string information read by the reading unit 220 in an external system.

Applicability is a concept indicating a degree of matching between character string information to be checked and conditional character string information referred to for the check, and an indicator indicating whether the character string information is applicable can be used. In the present exemplary embodiment, applicability is checked by determining whether character string information read by the reading unit 220 matches external system information indicating use conditions obtained by the obtaining unit 222. That is, the checking unit 224 checks whether read character string information can be used as character string information for an external system by determining whether the read character string information matches external system information indicating obtained use conditions. Alternatively, applicability may be an indicator of applicability indicating a degree of completion of a predetermined process in an external system at a time when character string information is used in the external system. The indicator increases as the predetermined process proceeds toward completion.

The display control unit 226 is a functional unit that displays, on the display unit 29, information (determination information) indicating results of checks conducted by the checking unit 224.

Next, the effect produced by the information processing apparatus 20 according to the present exemplary embodiment will be described.

In the present exemplary embodiment, a case where the information processing apparatus 20 conducts the operation checks ((6) in FIG. 1) in OCR performed on image data regarding a form input using the input device 60 will be described. In the operation checks, the information processing apparatus 20 checks whether a result of reading of a character string read from a form can be used in operation processing (i.e., applicability). In the operation checks, applicability of a result of reading of a character string read from a form is checked using operation check settings included in some of job rules, which are created in advance, selected by the user for a job. If a result of reading is inapplicable, inapplicability information (e.g., an error) indicating that the result of reading is inapplicable is detected.

Plural apparatuses might cooperate to perform operation processing. When an information processing apparatus that reads character string information written on a paper document and an external system that uses character string information cooperate and the information processing apparatus outputs the read character string information to the external system, for example, the information processing apparatus might fail to output the character string information. When use conditions are determined in advance for character string information input to the external system, for example, the information processing apparatus fails to output character string information if the character string information does not satisfy the use conditions.

In the present exemplary embodiment, therefore, whether read character string information matches external system information indicting use conditions is determined. The read character string information and determination information indicating whether the read character string information matches the external system information are then displayed in the same screen of the display unit 29. That is, read character string information and determination information for the character string information can be presented to the user together for a check.

An expression "displayed in the same screen" herein refers to a concept of display processing where two items are displayed in a common area, which is at least a part of a screen of the display unit 29. When the screen of the display unit 29 is a common area, for example, two items are both displayed in the common area. When plural windows are displayed on the display unit 29, one of the windows is determined as a common area, and two items are both displayed in the common area. When plural windows are displayed without overlapping one another, the windows are determined as common areas, and two items are both displayed in the common areas.

A result of reading is a concept including a result of character recognition (e.g., a character string) and a result of correction (e.g., a character string) obtained by correcting the character string that is the result of recognition. A result of correction is a concept including a result of correction of a mechanical error caused by erroneous character recognition, for example, and is not a result of correction that takes into consideration use conditions in operation processing.

Next, the operation check settings will be described with reference to FIGS. 4 to 7.

In the present exemplary embodiment, the user sets setting values of operation check settings included in job rules. If the user requests setting of operation rules after setting of job rules is completed, the information processing apparatus 20 begins to make the operation check settings.

Figure 4:
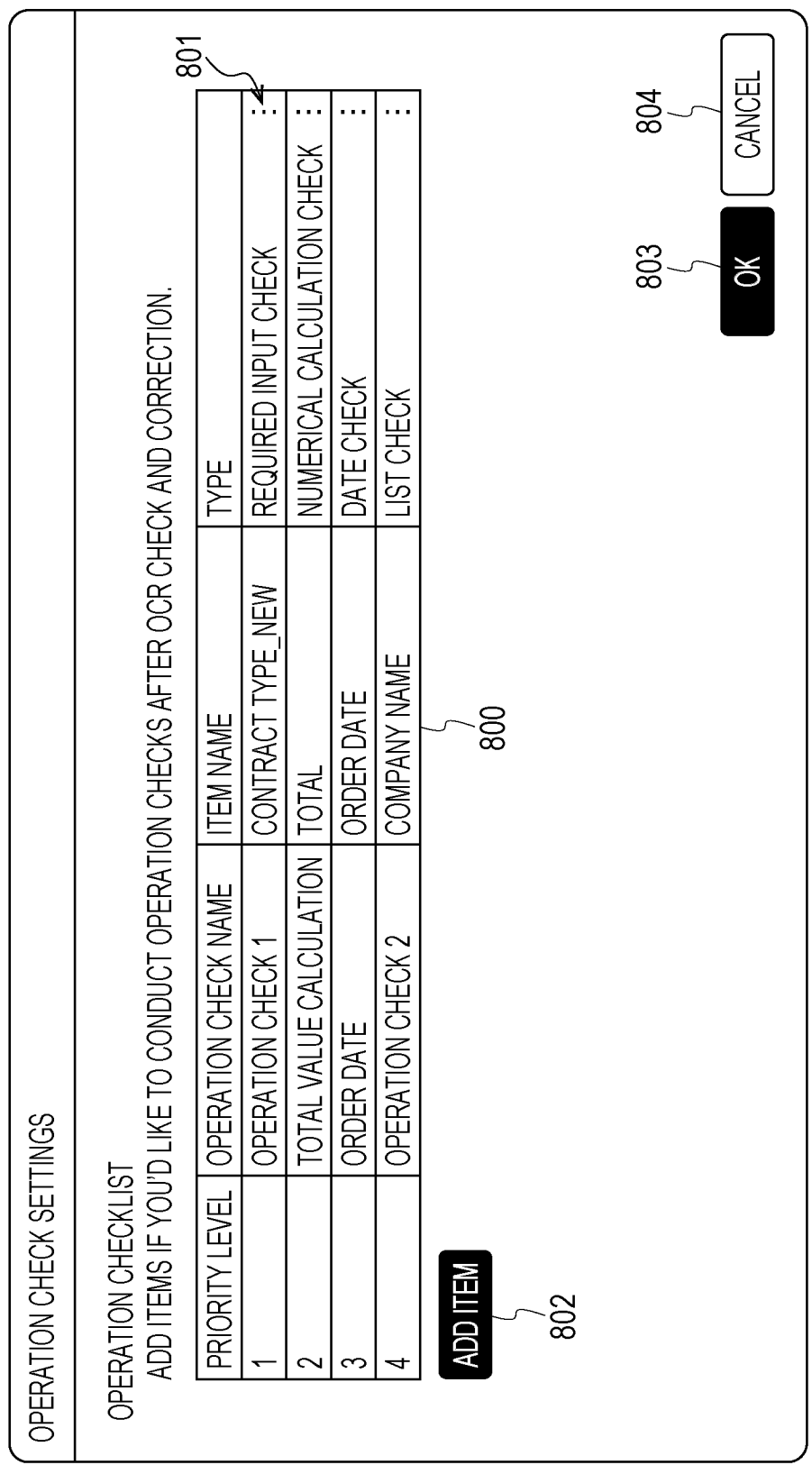
FIG. 4 is a diagram illustrating an example of a setting screen for an operation checklist relating to operation check settings.
Figure 5:
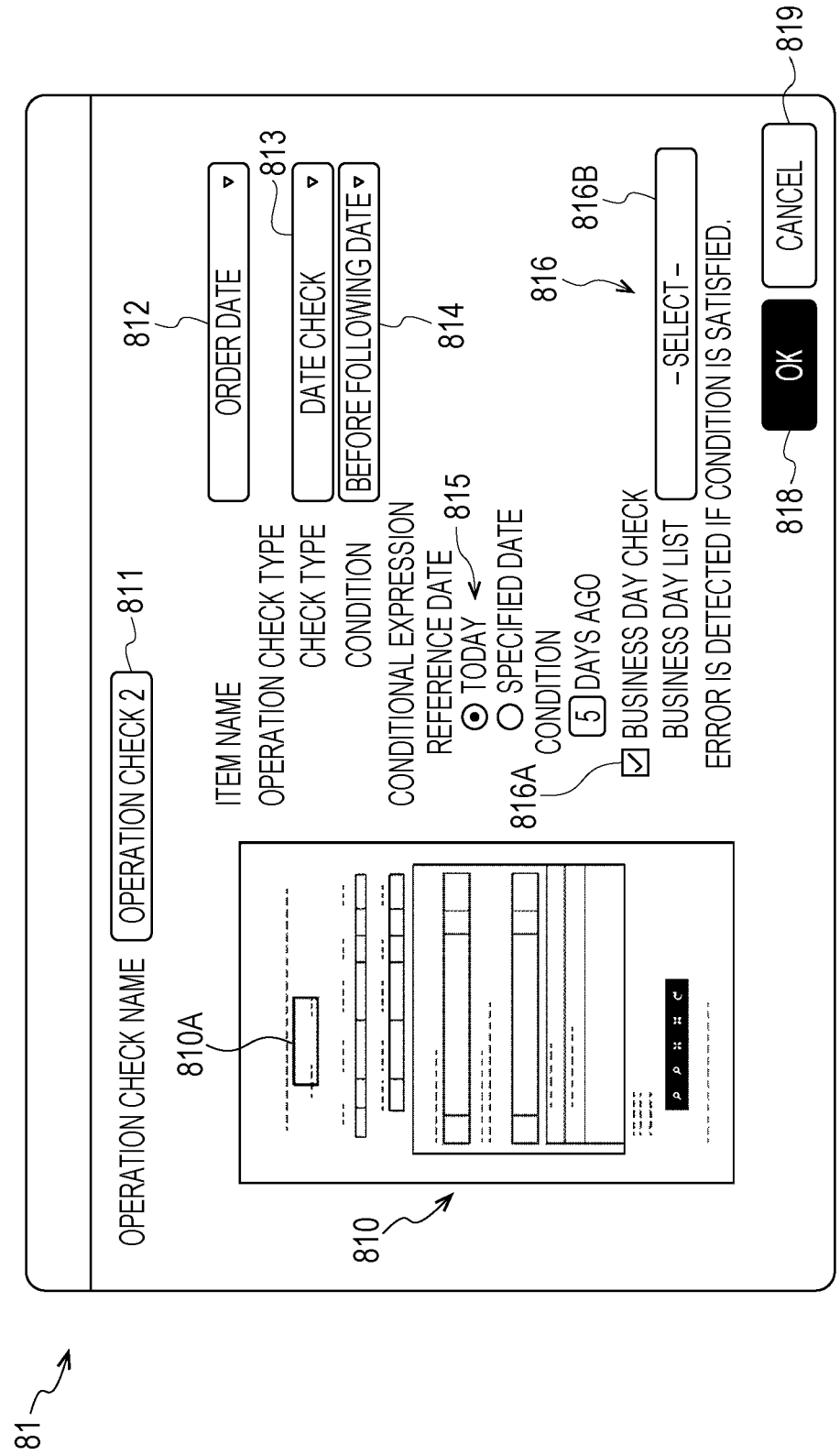
FIG. 5 is a diagram illustrating an example of a setting screen for definition settings relating to a date check.
Figure 6:
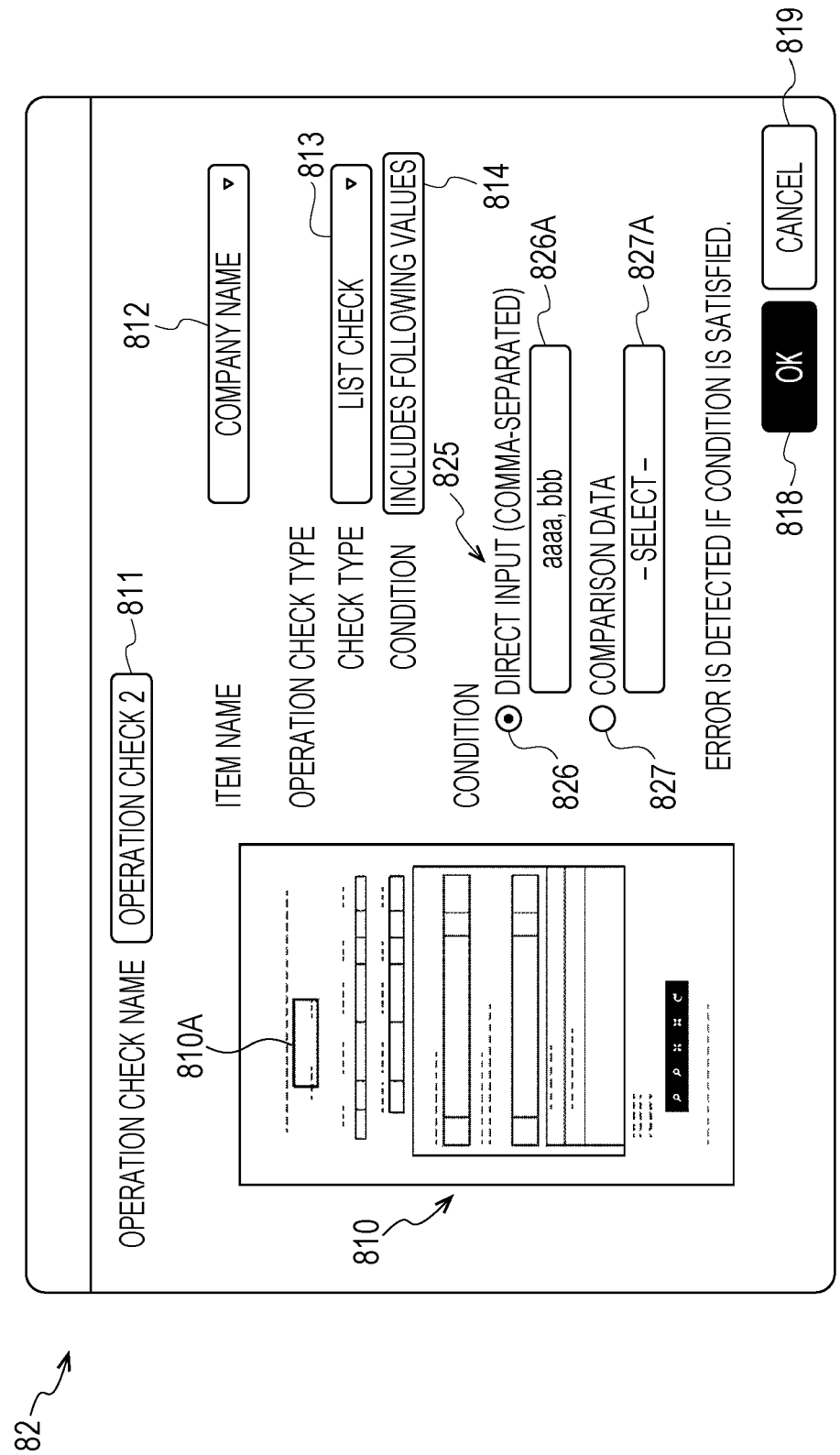
FIG. 6 is a diagram illustrating an example of a setting screen for definition settings relating to a list check.
Figure 7:
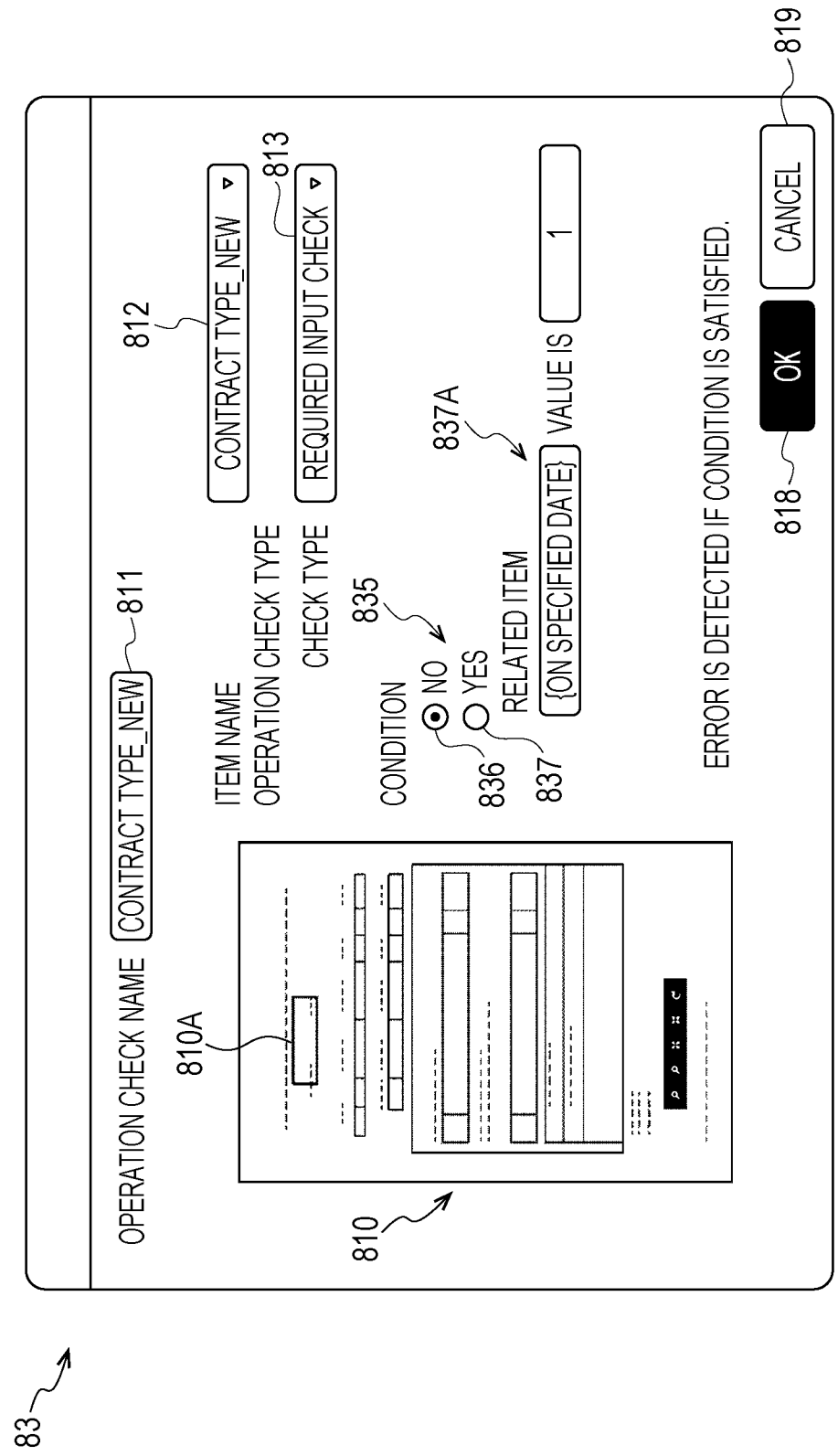
FIG. 7 is a diagram illustrating an example of a setting screen for definition settings relating to a required input check.

FIG. 4 is a diagram illustrating an example of a setting screen for an operation checklist relating to the operation check settings. FIGS. 5 to 7 are diagrams illustrating examples of setting screens for different types of operation check included in the operation checklist.

When the information processing apparatus 20 begins to make the operation check settings, a setting screen 80 illustrated in FIG. 4 is displayed. The setting screen 80 is a screen for the user to check types and settings of operation checks to be conducted. In the setting screen 80, an operation checklist 800 indicating a list of different types of operation check to be conducted on the basis of the settings is displayed. FIG. 4 illustrates an operation checklist 800 at a time when a required input check, a numerical calculation check, a date check, and a list check have been added as types of operation check. In the operation checklist 800, a record in which a priority level, an operation check name, an item name, and a type are associated with one another is registered for each operation check. The priority level is information indicating order of execution of an operation check included in the operation checklist 800. The operation check name is information indicating a name of an operation check. The item name is information indicating an item to be checked in an operation check. The type is information indicating a type of operation check.

In the setting screen 80, the user can perform operations on the operation checklist 800 and the operation check settings using buttons. The setting screen 80 includes an add item button 802 for adding a new operation check to the operation checklist 800. The setting screen 80 also includes an OK button 803 for ending setting of the operation checklist 800 and a cancel button 804 for canceling the setting of the operation checklist 800. The user can edit, delete, or change the priority level of each of the operation check settings by pressing an edit button 801 (ellipsis points in FIG. 4). If the user presses one of the edit buttons 801 to select editing, a process for editing an operation check corresponding to the pressed edit button 801 starts.

If the user presses the add item button 802, a process for adding a new operation check starts, and the user can make settings for the new operation check.

FIG. 5 is a diagram illustrating an example of a setting screen relating to a date check.

If the user performs a process for adding an operation check, a setting screen 81 is displayed. In the setting screen 81, an input field 811 for inputting an operation check name is displayed. Although "operation check 2" is displayed in the example illustrated in FIG. 5, the input field 811 can be edited.

In the setting screen 81, a read image (e.g., a scan image of a form) 810 is displayed. In the read image 810, an area image 810A indicating an area of an image to be checked is displayed. The use can set a position of the area image 810A.

The setting screen 81 includes an input field 813 for selecting and inputting a type of operation check. The input field 813 is displayed as a drop-down menu, for example, so that the user can select one of predetermined types of operation check. A case where the user selects "date check" as a type of operation check will be described.

If the user selects "date check" in the input field 813 of the setting screen 81, the user can input an item relating to the date check and a date condition as a conditional expression for the item. The condition input in the setting screen 81 is an example of a use condition. If the user selects "date check" in the drop-down menu as a type of operation check, the user can input an item and a condition relating to the date check.

In the setting screen 81, an input field 812 for selecting and inputting an item name relating to the date check using a drop-down menu is displayed. FIG. 5 illustrates a case where "order date" is selected in the input field 812.

The setting screen 81 also includes input fields 813 and 814 for making settings relating to the type of operation check. The input field 813 is an input field for selecting and inputting a type of operation check ("check type" in FIG. 5) using a drop-down menu. FIG. 5 illustrates a case where "date check" is selected in the input field 813. The input field 814 is an input field for selecting and inputting a definition of a condition ("condition" in FIG. 5) relating to the date check selected in the input field 813 using a drop-down menu. FIG. 5 illustrates a case where "before following date" is selected and displayed in the input field 814. In the present exemplary embodiment, "within following date range", "outside following date range", "before following date", or "after following date" can be selected in the input field 814.

The setting screen 81 also includes an input field 815 for setting a value of a condition ("conditional expression" in FIG. 5) relating to the date check. An input and display format (a form and layout of a screen) of the conditional expression, which is the value of the condition, changes in the input field 815 in accordance with the condition selected in the input field 814. FIG. 5 illustrates a case where the definition "before following date" is selected and a reference date or a date range condition can be set as values of the condition. In the example illustrated in FIG. 5, the input field 815 includes, as the reference date, radio buttons with which "today" or "specified date" can be selected and an input field for inputting a date condition in relation to the reference date.

The setting screen 81 also includes an input field 816 for making settings relating to "business day check", which is another condition relating to the date check. In the input field 816, information for making settings for checking a result of reading of a character string read from a form, that is, whether the result of reading is applicable, is displayed. More specifically, settings relating to business days applicable in the external system are displayed. In FIG. 5, the input field 816 includes a checkbox 816A for selecting whether to conduct a business day check as a definition of a condition and an input field 816B for selecting and inputting a value of the condition. If the user checks the checkbox 816A, a business day list is displayed in the input field 816B in a selectable manner. In the input field 816B, the user can select a business day list registered in the database 25D stored in the storage unit 25 using a drop-down menu.

The setting screen 81 also includes an OK button 818 for completing the making of the operation check settings and a cancel button 819 for canceling the making of the operation check settings. If the user presses the OK button 818, the process for setting an operation checklist resumes, and the setting screen 80 for the operation checklist illustrated in FIG. 4 is displayed. When a new operation check is created, settings of the created operation check are added to the operation checklist 800. If the user presses the cancel button 819, on the other hand, settings are discarded. The process for setting an operation checklist then resumes, and the setting screen 80 for the operation checklist illustrated in FIG. 4 is displayed.

FIG. 6 is a diagram illustrating an example of a setting screen for settings relating to the list check.

FIG. 6 illustrates a setting screen 82 at a time when the user has performed a process for adding an operation check and selected "list check" in the input field 813 as a type of operation check.

If the user selects "list check" in the input field 813, the user can input an item and a condition relating to the list check in the setting screen 82.

The input field 812 is an input field for inputting a target item name in the list check. FIG. 6 illustrates a case where the user has selected and displayed "company name".

The input field 813 is an input field for a type of operation check. FIG. 6 illustrates a case where the user has selected and displayed "list check". The input field 814 is an input field for a definition of the condition relating to the list check. FIG. 6 illustrates a case where the user has selected and displayed "includes following values". In the present exemplary embodiment, the user can select "includes following values" or "exclude following values" in the input field 814.

The setting screen 82 includes an input field 825 for setting a value of the condition ("condition" in FIG. 6) relating to the list check. An input and display format of the value of the condition in the input field 825 changes in accordance with the selection made by the user in the input field 814. FIG. 6 illustrates a case where a value can be set for the condition "includes following values". In the example illustrated in FIG. 6, the input field 825 includes radio buttons 826 and 827 with which "direct input" or "comparison data" can be selected as the value of the condition and an input field for a condition relating to a character string.

If the user selects the radio button 826 indicating "direct input", an input field 826A activates, and the condition relating to a character string can be input. For example, a reference character string for checking a character string is input in the input field 826A (e.g., a character string separated by a comma is input, such as "aaaa,bbb").

If the user selects the radio button 827 indicating "comparison data", an input field 827A activates, and the condition relating to a character string applicable in the external system can be input. The condition indicating the comparison data corresponds to a condition for making settings for checking the applicability of a result of reading of a character string read from a form, that is, whether the result of reading is applicable. That is, settings relating to a character string applicable in the external system are displayed. More specifically, database names and field names of databases (e.g., column names) are displayed in the input field 827A as a list as comparison databases registered in advance to the database 25D stored in the storage unit 25. The user can select a target comparison database from the list. FIG. 6 illustrates a case where a message asking the user to select a comparison database is displayed in the input field 827A.

The settings relating to the list check are an example of settings of a restriction condition included in the use conditions in the present disclosure. The setting "includes following values" as the definition of the condition is an example of the permission condition that defines character strings applicable in the external system. The setting "exclude following values" is an example of the inhibition condition that defines character strings inapplicable in the external system. For example, a so-called "whitelist" is used as an example of the permission condition, and a so-called "blacklist" is used as an example of the inhibition condition.

FIG. 7 is a diagram illustrating an example of a setting screen for settings relating to the required input check.

FIG. 7 illustrates a setting screen 83 at a time when the user has performed a process for adding an operation check and selected "required input check" in the input field 813 as a type of operation check.

When the user has selected "required input check" in the input field 813, the user can input an item and a condition relating to the required input check in the setting screen 83.

The input field 812 is an input field for inputting a target item name in the required input check. FIG. 7 illustrates a case where the user has selected and displayed "contract type_new".

The input field 813 is an input field for inputting a type of operation check. FIG. 7 illustrates a case where the user has selected and displayed "required input check". In the settings relating to the required input check, a definition of the condition is omitted and an input and display format of a value of the condition ("condition" in FIG. 7) relating to the required input check changes in order to set a required input. That is, in the setting screen 82, an input and display format of an input field 835 changes to that of a value of a condition in accordance with "required input check" selected by the user. In the example illustrated in FIG. 7, the input field 835 includes radio buttons 836 and 837 with which whether to use a required input condition can be selected and an input field for inputting a condition value for a related item.

If the user selects the radio button 836, which indicates that a required input condition is not to be used, it is determined that there is no item relating to the item name specified in the input field 812, and the item in the input field 812 is set as a required input item.

If the user selects the radio button 837, which indicates that a required input condition is to be used, an input field 837A activates, and the user can input a related item. More specifically, for example, a related item defined by the database 25D is displayed in a selectable manner, and, if selecting the related item, the user can set a state of a value of the selected related item in which the item becomes a required input item.

Information indicating the operation check settings is registered to the database 25D stored in the storage unit 25 as external system information. The information indicating the operation check settings includes information indicating use conditions relating to use of character string information in the external system and functions as information for determining whether character string information can be used in the external system.

Next, information processing performed in accordance with operation check settings made by the user as job rules will be described in detail.

Figure 8:
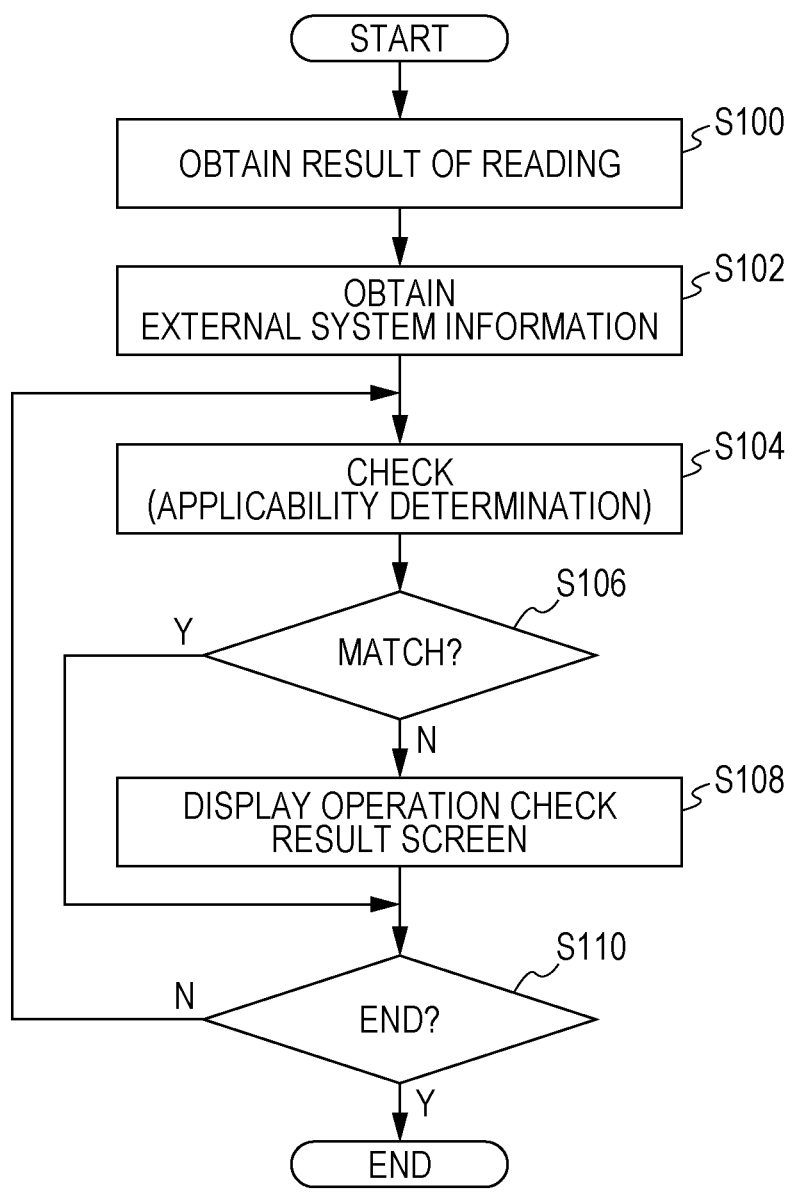
FIG. 8 is a flowchart illustrating an example of a process for processing information achieved by an information processing program according to the exemplary embodiment.

FIG. 8 is a flowchart illustrating an example of a process for processing information achieved by the information processing program 25P according to the present exemplary embodiment.

First, the user instructs the information processing apparatus 20 to activate the information processing program 25P, and the CPU 22 performs the following steps.

In step S100, the CPU 22 obtains a result of reading by obtaining character string information read from a form in which a character string is written. The character string information indicating the result of reading can be obtained from a result obtained at an end of the reading result check and correction ((5) in FIG. 1) in OCR performed by executing the system program 25S using the information processing apparatus 20. A process for obtaining a result of reading is an example of a function of the reading unit 220 illustrated in FIG. 3.

In step S102, the CPU 22 obtains external system information including information indicating use conditions relating to use of character string information in an external system from the database 25D stored in the storage unit 25. A process for obtaining external system information is an example of a function of the obtaining unit 222 illustrated in FIG. 3.

In step S104, the CPU 22 checks applicability of the read character string information with the external system. That is, the CPU 22 conducts an operation check for checking the applicability by determining whether the character string information read in step S100 matches the external system information obtained in step S102. A result of the check conducted in step S104 is an example of determination information. A process for obtaining external system information is an example of a function of the checking unit 224 illustrated in FIG. 3.

In step S106, the CPU 22 determines, on the basis of the result of the check conducted in step S104 (e.g., determination information), whether the read character string information matches the external system information. If a result of step S106 is positive, the process proceeds to step S110. If the result of step S106 is negative, the process proceeds to step S108.

In step S108, the CPU 22 displays an operation check result screen including the result of the check conducted in step S104, and the process proceeds to step S110.

Although the CPU 22 displays the operation check result screen if the read character string information does not match the external system information (N in step S106) in the above description, the CPU 22 may display the operation check result screen, instead, if the read character string information matches the external system information (Y in step S106). In this case, the CPU 22 may perform step S108 after performing step S104 while omitting step S106. A process for displaying a result of a check is an example of a function of the display control unit 226 illustrated in FIG. 3.

In step S110, the CPU 22 determines, on the basis of information from the operation input unit 28 indicating an instruction to end the information process given by the user or information indicating that all items have been checked, whether to end the information processing. If a result of step S110 is negative, the process returns to step S104. If the result of step S110 is positive, the process achieved by the information processing program 25P ends.

When the user checks results of operation checks, the user might desire to be able to understand a reason why read character string information can be used in the external system. In the present exemplary embodiment, therefore, read character string information and external system information (e.g., information including use conditions) used for checks are displayed on the same operation check result screen in order for the user to check results of operation checks.

Figure 9:
FIG. 9 is a diagram illustrating an example of a check screen relating to an operation check according to the exemplary embodiment.

FIG. 9 is a diagram illustrating an example of the operation check result screen. FIG. 9 illustrates an example of an operation check result screen 90 including a scan image 900 of a form and a display area 901 indicating results of operation checks.

In the display area 901 indicating results of operation checks, results of operation checks for items for which it has been determined that character string information is inapplicable. The display area 901 includes a display area 911 for each of items for which it has been determined that character string information is inapplicable. That is, a result of an operation check for an item defined as the operation check is displayed in each of the display areas 911. In FIG. 9, the display area 911 is provided for each of items having item names of, for example, "delivery date", "registration condition", and "address". In each of the display areas 911, areas relating to an item name, a result of reading, a result of a check, and "check" for indicating that the user has checked the corresponding item are set. The display area 911 for the item name "delivery date", for example, includes an image 912 indicating an item name, images 913 and 914 of a result of reading, images 915 and 916 indicating a result of a check, and an image 917 for enabling the user to set information indicating that the item has been checked.

In the example illustrated in FIG. 9, the display area 911 includes an image of a result of the reading result check and correction ((5) in FIG. 1). More specifically, the display area 911 includes the image 913 of a result of reading of the target item and the image 914 indicating a result of comparison based on a result of character recognition of the image 913. The image 914 indicating the result of comparison indicates a result of comparison obtained by converting the result of character recognition of the image 913 in such a way as to become applicable in the external system. The user can correct a character string displayed as the image 914. For example, the user can correct information indicating the result of comparison (character string) in the operation check result screen 90.

The images 915 and 916 indicating the result of a check relate to a result of a determination whether an external system condition based on use conditions set in the operation check settings is satisfied. In the present exemplary embodiment, a result of a determination at a time when the external system condition is not satisfied (e.g., at a time of an error) is displayed as the images 915 and 916 indicating the result of a check. More specifically, the image 915 indicating that the external system condition is not satisfied and the image 916 indicating a reason why the external system condition is not satisfied are displayed.

The image 917 indicates a checkbox for enabling the user to set information indicating that the item has been checked. By selecting the image 917 after checking the item, the user can complete the check and turn the image 917 into a checked checkbox.

As described above, since a result of an operation check is displayed, the user can check the result of the operation check. In addition, since a result of reading and a result of a check are displayed in the same screen, the user can check a result of a determination whether a character string written in a form is applicable in an external system. In this case, by displaying information indicating that the character string written in the form is inapplicable in the external system as a result of a check, the user can understand a reason why the character string is inapplicable in the external system. Alternatively, by displaying information indicating that the character string written in the form is applicable in the external system as a result of a check, the user can confirm that the character string is applicable in the external system.

Although an example where some information is displayed in a correctable manner in the operation check result screen 90 has been described, a result of a check may be displayed as an operation check result screen, instead.

FIG. 10 is a diagram illustrating another example of the operation check result screen according to the present exemplary embodiment. FIG. 10 illustrates, as an operation check result screen 92, a screen in which a list of details of items for which it has been determined that character string information does not match external system information is displayed. In the present exemplary embodiment, details of items for which it has been determined that an external system condition is not satisfied (e.g., at a time of an error) are displayed as information indicating a result of a check.

As illustrated in FIG. 10, the operation check result screen 92 includes items such as a read image, a result of recognition, an error icon, and an error message as details ("items" in FIG. 10) of items for which it has been determined that character string information is inapplicable. In each set of the details, a type and a description are associated with each other. The read image corresponds to the image 913 illustrated in FIG. 9. The result of recognition corresponds to the image 914. The error icon corresponds to the image 915.

The description associated with the error message is provided in a display area 920 for a result of a check. FIG. 10 illustrates a display area 921 for a case where it has been determined in the operation checks that only one item is inapplicable (error) and a display area 922 for a case where it has been determined that plural items are inapplicable.

When the number of error is one, information in the display area 921 is used, and the images 913, 915, and 916 are displayed. That is, the images 915 and 916 indicating a result of a check are displayed in the same area of the same screen for the read image 913. The image 914 may be added to the read image 913. Since a result of reading and a result of a check are displayed in the same screen, the user can check a result of a determination whether a character string written in a form is applicable in an external system. In addition, since the image 916 is displayed, the user can understand a reason why a character string written in a form is inapplicable in an external system.

When the number of errors is two or more, information in the display area 922 is used, and plural results of checks are displayed. That is, the images 915 and 916 indicating a result of a check are displayed in the same area of the same screen for each of the results of checks for the read image 913. FIG. 10 illustrates a case where images 915A and 916A and images 915B and 916B are displayed in the same area of the same screen as images indicating results of checks, namely "word check A" and "word check B", for example, in the operation checks.

In the display area 922, plural combinations of an operation check name and an error message are displayed in a display area 927, which indicates another display format at a time when there are plural errors, while omitting the image 915.

Since a result of reading and a result of a check are thus displayed in the same screen even when there are plural errors, the user can check a result of a determination whether a character string written in a form is applicable in an external system. In addition, since the image 916 is displayed, the user can understand a reason why the character string written in the form is inapplicable in the external system.

As described above, according to the present exemplary embodiment, whether character string information written on a paper document is applicable in an external system can be checked.

The information processing apparatus 20 according to the present exemplary embodiment is configured to output data in a comma-separated values (CSV) format. In the present exemplary embodiment, therefore, a process for displaying a result of recognition and a result of comparison in the same screen is performed, and after the result of recognition is confirmed, settings relating to data conversion at a time when data (e.g., a CSV file) is output to an external system can be made. The data conversion is, for example, CSV conversion.

FIGS. 11 and 12 illustrate examples of setting screens relating to the data conversion. FIG. 11 is a diagram illustrating an example of a setting screen for setting a data format at a time when information including results of recognition is output as a CSV file. FIG. 12 is a diagram illustrating an example of a setting screen relating to one of items (column A in FIG. 12) in the CSV file. As illustrated in FIGS. 11 and 12, by making settings relating to the data conversion, a result of reading (e.g., a result of recognition) and information associated with the result of reading can be output automatically or manually.

An information processing apparatus according to an exemplary embodiment has been described. A program for causing a computer to achieve the functions of the components of the information processing apparatus may be used to implement the exemplary embodiment, instead. A computer readable medium storing the program may be used to implement the exemplary embodiment, instead.

The configuration of the information processing apparatus described in the exemplary embodiment is an example and may be modified depending on a situation insofar as the spirit of the present disclosure is not deviated from.

The processing achieved by the programs in the exemplary embodiment is an example, and some steps deemed unnecessary may be omitted, new steps may be added, or order of steps may be changed, insofar as the scope of the present disclosure is not deviated from.

Although a case where the processing according to the exemplary embodiment is achieved by a software configuration using a computer that executes the programs has been described in the exemplary embodiment, a method for achieving the processing according to the exemplary embodiment is not limited to this. For example, the exemplary embodiment may be achieved by a hardware configuration or a combination of a hardware configuration and a software configuration, instead.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
read character string information written on a paper document;

obtain, from an external system that performs processing using the read character string information, external system information indicating a use condition relating to use of character string information in the external system, the use condition being set by a user and indicating a time condition which is a predetermined time period for the character string information to be used by the external system in performing the processing; and determine whether the read character string information matches the external system information obtained from the external system.

2. The information processing apparatus according to claim 1, wherein the processor is configured to:

output, if the read character string information matches the external system information, the read character string information to the external system; and display, if the read character string information does not match the external system information, inapplicability information, which indicates that the read character string information does not match the external system information, including the read character string information and the external system information on a display.

3. The information processing apparatus according to claim 2, wherein the processor is configured to display, if the read character string information does not match the external system information, the read character string information on the display in a correctable manner.

4. The information processing apparatus according to claim 3, wherein the use condition indicates at least either a permission condition for permitting use of predetermined character string information or an inhibition condition for inhibiting use of predetermined character string information for the character string information used for the processing to be performed by the external system.

5. The information processing apparatus according to claim 2, wherein the use condition indicates at least either a permission condition for permitting use of predetermined character string information or an inhibition condition for inhibiting use of predetermined character string information for the character string information used for the processing to be performed by the external system.

6. The information processing apparatus according to claim 1, wherein the use condition indicates at least either a permission condition for permitting use of predetermined character string information or an inhibition condition for inhibiting use of predetermined character string information for the character string information used for the processing to be performed by the external system.

7. A non-transitory computer readable medium storing a program causing a computer to execute a process for processing information, the process comprising:

reading character string information written on a paper document;

obtaining, from an external system that performs processing using the read character string information, external system information indicating a use condition relating to use of character string information in the external system, the use condition being set by a user and indicating a time condition which is a predetermined time period for the character string information to be used by the external system in performing the processing; and determining whether the read character string information matches the external system information obtained from the external system.

8. An information processing apparatus comprising:

means for reading character string information written on a paper document;

means for obtaining, from an external system that performs processing using the read character string information, external system information indicating a use condition relating to use of character string information in the external system, the use condition being set by a user and indicating a time condition which is a predetermined time period for the character string information to be used by the external system in performing the processing; and means for determining whether the read character string information matches the external system information obtained from the external system.

* * * * *